Oct. 20, 1936.  R. A. MONROE  2,058,174
VIBRATION DAMPER
Filed Oct. 6, 1933
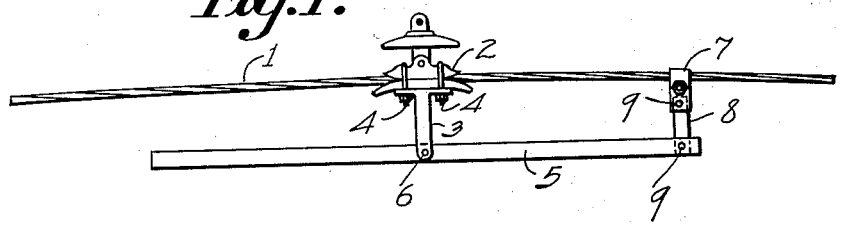
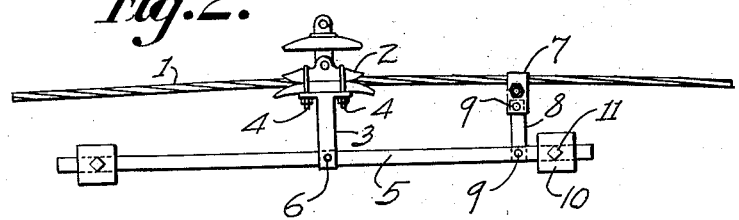
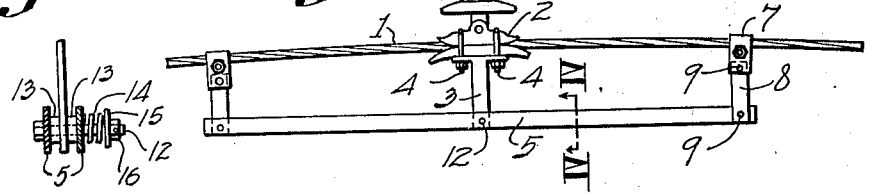
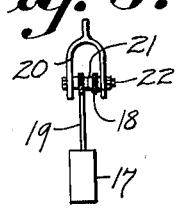
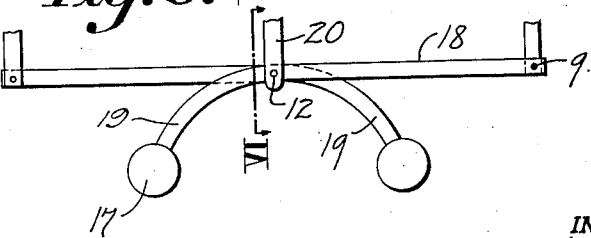
INVENTOR
Robert A. Monroe
BY
ATTORNEY Patented Oct. 20, 1936

2,058,174

UNITED STATES PATENT OFFICE 2,058,174

VIBRATION DAMPER

Robert A. Monroe, Mount Lebanon, Pa., assignor to Aluminum Company of America, Pittsburgh, Pa., a corporation of Pennsylvania Application October 6, 1933, Serial No. 692,519

5 Claims. (Cl. 248—63)

This invention relates to vibration dampers for preventing or minimizing vibration in suspended wires, cables and the like, such as are commonly used in electrical transmission lines.

It has been recognized that any suspended cable or wire such as is commonly used for the transmission of electrical energy, irrespective of material, span length, tension, size, or character of supports, will vibrate under certain conditions. It has been established that this vibration is caused chiefly by transverse air currents and that the vibrations occur almost entirely in a vertical plane. This vertical vibration is manifested by loops and nodes formed throughout the entire length of the conductor span. The loop length, frequency and amplitude vary over a wide range in any given span, due mostly to variations in wind velocity and direction.

The detrimental effects of this vibration, such as fatigue failure of the conductor at its points of support, have created a demand for devices capable of reducing or eliminating the vibration. Various means have been proposed in the past to accomplish this, many of which are quite satisfactory under certain conditions. The most successful of these previous means have been dependent either on absorption of the energy by fluid and mechanical friction or by the action of a spring-suspended weight.

However, dampers incorporating these principles are somewhat limited in effectiveness in certain applications and under certain conditions. Those dampers dependent on mechanical friction may suffer in time from wear of the parts, causing a diminution of effectiveness, and corrosion may cause sticking, rendering the damper inoperative. Fluid friction dampers vary in effectiveness with changes in temperature, which cause changes in the viscosity of the fluid. The fluid in these dampers occasionally needs replenishing due to leakage or other losses which presents an expensive and hazardous maintenance problem, particularly if the transmission line on which the dampers are installed is in use. At certain critical frequencies of vibration, dampers employing springs fall into resonance with the vibration in the line and during such periods they suffer a decrease in effectiveness.

It is an object of my invention to provide means for damping vibration in transmission lines which is more effective than previous means and capable of broad application. Another object is the provision of means for damping vibration which is simple and economical to construct and which is capable of application to existing transmission lines as well as newly constructed lines. Other objects will be apparent from the following description and the drawing in which:

Fig. 1 shows one embodiment of my invention in operative position on a transmission line of typical construction;

Fig. 2 shows a modification of the device shown in Fig. 1;

Fig. 3 shows another modification of my invention adapted to be effective on two adjacent spans;

Fig. 4 is a sectional view taken on line IV—IV of Fig. 3;

Fig. 5 shows a further modification of my invention also adapted to be effective on two adjacent spans;

Fig. 6 is a sectional view taken on line VI—VI of Fig. 5.

Referring to the drawing and particularly to Fig. 1 thereof, the transmission line 1 is held by a typical insulated suspension clamp 2 attached to a transmission line tower or the like, not shown. A standard 3 is dependent from the clamp 2 and may be conveniently fixed thereto by the clamping bolts 4. A mass in the form of a bar 5 is secured to the standard 3 by a pivot pin 6. One end of the bar 5 is attached to the transmission line by means of the clamp 7 tightly gripping the cable and a link 8 pivotally attached by pins 9 to the end of the bar 5 and the clamp 7, the opposite end of the bar forming a cantilever as shown.

When the line 1 vibrates, the ends of the bar 5 move up and down alternately. This motion causes the bar to oscillate about the pivot pin 6 and as it requires energy to start the bar rotating in one direction, it also requires energy to stop this motion and start rotation in the opposite direction. The energy required to accelerate and decelerate the bar is abstracted from the line and this abstraction of energy prevents the vibration of the line from building up to any appreciable extent, or to an extent that would in time cause fatigue failure of the line, either at its point of attachment to the suspension clamp or in the span.

As the amount of energy to be abstracted from the line is dependent both on the velocity of the vibrations and the mass of the bar, it is apparent that with different sizes of transmission line cable and different span lengths, it may be advisable to increase or decrease the weight of the bar. This may most conveniently be done by either attaching weights to the ends of the bar or so placing the mass that it is given a greater amplitude of movement and therefore a greater velocity than the movement of the vibration of the cable.

Means adapted to compensate for these variations are illustrated in Fig. 2. The bar 5, mounted on the standard 3 in the same manner as the bar in Fig. 1, is extended past the link 8 and is provided with weights 10 slidably mounted on each end. Fastening means such as set screws 11, are provided to adjustably secure the weights to the bar. The damping characteristics can be modified as desired either by using larger or smaller weights or by moving the weights toward or away from the pivot 6.

The construction illustrated by Figs. 3 and 4 is adapted for use with two adjacent spans. The bars 5 may be mounted in the same manner as the bar shown in Fig. 1, one on each side of the standard 3 and each having one end connected to one of the spans, or they may be mounted as best illustrated in Fig. 4 by mounting on the pivot bolt 12, each bar being spaced from the standard 3 by collars 13. A spring 14 is provided between the washer 15 and the nut 16 to keep the assembly in tight-pressed engagement. In this construction, part of the energy of the vibrating line will be absorbed by friction between the parts of the assembly. The amount of friction can be conveniently varied by increasing or decreasing the pressure on the spring by means of the nut 16, in a well known manner.

Figs. 5 and 6 illustrate another form of bar which may be used when the weights have considerable bulk, and also show another form of pivotal support. When two dampers mounted on adjacent spans and the same standard have weights of considerable bulk, such as weights 17, the parts 18 can be provided with downwardly curving portions 19 to prevent their interference with the adjacent damper. The standard illustrated in Fig. 6 is provided with a bifurcated portion 20, the bars being separated by collars 21 mounted on pivot pin 22. Friction may be introduced by tightening the nut on the pivot pin, or otherwise, if desired.

In all of the illustrations given I have shown the standard or support for the pivoted mass attached to a suspension clamp. This is merely a convenient form of construction, as the support can be attached to the line tower, for example, if properly insulated, but it must be supported independently of the line proper to secure the best results.

While I have illustrated and described several specific forms of my invention, it will be understood that I do not wish to be limited thereto since various modifications and changes will readily suggest themselves to those skilled in the art and many such modifications and changes may be made without departing from the scope of my invention as defined in the appended claims.

I claim:

1. A vibration damper for transmission lines or the like supported in spans by clamps, comprising a standard fixed to a supporting clamp, a mass in the form of a bar pivoted intermediate its ends in said standard, means for connecting one end of said bar to the line including a clamp fixed to the line within the span and a link having one end pivotally connected to the mass and having the opposite end pivotally connected to said second-named clamp, the other end of said bar being free.

2. A vibration damper for transmission lines or the like supported in spans, comprising an oscillatable mass, means for pivotally supporting said mass, and means for connecting said mass to the transmission line at one point intermediate the supports for said line, said mass being substantially balanced about said pivotal support and adapted to be oscillated through said connecting means by vibration of said line.

3. A vibration damper for transmission lines or the like supported in spans, comprising a mass in the form of a bar, means for supporting said mass including a pivot pin and means for connecting said mass to the transmission line, said mass having the pivoted support positioned intermediate the ends of said mass, one of the ends of said mass being attached to said line by said connecting means, and the other end of said mass being free.

4. A vibration damper for transmission lines or the like supported in spans, comprising a mass, means for supporting said mass permitting oscillation thereof about its center of gravity, and means connecting said mass to the transmission line and adapted to transmit vibration of the line to the mass to oscillate said mass, thereby dampening the vibration by the energy required to accelerate and decelerate the mass.

5. A vibration damper for transmission lines or the like supported in spans by clamps, comprising a standard fixed to a supporting clamp, a bar pivoted intermediate its ends on said standard, means for connecting one end of said bar to the line, said connecting means including a clamp fixed to the line within the span and a link having one end pivotally connected to said bar and having the opposite end pivotally connected to said second-named clamp, the opposite end of said bar being free, and weights mounted on said bar and capable of adjustment with respect thereto toward or away from said standard.

ROBERT A. MONROE.